(12) United States Patent
Kurokawa

(10) Patent No.: US 8,982,099 B2
(45) Date of Patent: Mar. 17, 2015

(54) TOUCH PANEL AND DRIVING METHOD OF THE SAME

(75) Inventor: Yoshiyuki Kurokawa, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 649 days.

(21) Appl. No.: 12/816,034

(22) Filed: Jun. 15, 2010

(65) Prior Publication Data

US 2010/0328269 A1    Dec. 30, 2010

(30) Foreign Application Priority Data

Jun. 25, 2009   (JP) ................................. 2009-150601
Jun. 25, 2009   (JP) ................................. 2009-150602

(51) Int. Cl.
     *G06F 3/042*      (2006.01)
     *G06F 3/041*      (2006.01)

(52) U.S. Cl.
     CPC .............. *G06F 3/042* (2013.01); *G06F 3/0416* (2013.01)
     USPC ............................................ 345/175; 331/57

(58) Field of Classification Search
     USPC ............................................ 345/98, 100, 207
     See application file for complete search history.

(56) References Cited

U.S. PATENT DOCUMENTS

| | | | | |
|---|---|---|---|---|
| 4,109,643 A | * | 8/1978 | Bond et al. .................... | 600/479 |
| 4,255,768 A | * | 3/1981 | Kubota ......................... | 386/263 |
| 5,307,169 A | * | 4/1994 | Nagasaki et al. ............. | 348/307 |
| 6,127,960 A | | 10/2000 | Silver et al. | |
| 6,208,282 B1 | * | 3/2001 | Miyamoto ..................... | 341/158 |
| 6,777,663 B2 | | 8/2004 | Mattison | |
| 6,777,664 B2 | | 8/2004 | Mattison | |
| 6,870,150 B2 | | 3/2005 | Mattison | |
| 6,888,121 B2 | | 5/2005 | Mattison | |
| 6,963,250 B2 | * | 11/2005 | Ngo et al. ....................... | 331/57 |
| 7,999,716 B2 | | 8/2011 | Kurokawa | |
| 8,014,055 B2 | | 9/2011 | Mochizuki | |

(Continued)

FOREIGN PATENT DOCUMENTS

CN      101373779      2/2009
EP      2083518 A      7/2009

(Continued)

OTHER PUBLICATIONS

Japanese Office Action (Application No. 2010-142165) dated Apr. 8, 2014.

(Continued)

*Primary Examiner* — Sumati Lefkowitz
*Assistant Examiner* — Joseph Fox
(74) *Attorney, Agent, or Firm* — Nixon Peabody LLP; Jeffrey L. Costellia

(57) ABSTRACT

It is an object to provide a touch panel which includes an A/D converter circuit and has a function of image shooting with high resolution and high-level gray scale and at high operation speed. A touch panel includes a plurality of pixels each provided with a display element and a photo sensor, an A/D converter to which a first potential is applied from a photo sensor, and a reading circuit. The A/D converter includes an oscillation circuit which changes the oscillating frequency of a first signal to be generated in accordance with the first potential and stops oscillating when a second potential is applied thereto from the reading circuit, and a counter circuit which generates a second signal having a discrete value determined in accordance with the oscillating frequency.

12 Claims, 12 Drawing Sheets

(56) References Cited

U.S. PATENT DOCUMENTS

| | | |
|---|---|---|
| 8,248,131 B2 | 8/2012 | Kurokawa |
| 8,314,642 B2 | 11/2012 | Kurokawa |
| 2002/0011972 A1 | 1/2002 | Yamazaki et al. |
| 2002/0052192 A1 | 5/2002 | Yamazaki et al. |
| 2005/0110578 A1 | 5/2005 | Ngo et al. |
| 2007/0182723 A1 | 8/2007 | Imai et al. |
| 2009/0195511 A1* | 8/2009 | Cites et al. ............... 345/173 |
| 2010/0085331 A1 | 4/2010 | Kurokawa et al. |
| 2011/0216042 A1* | 9/2011 | Wassvik et al. ............ 345/175 |

FOREIGN PATENT DOCUMENTS

| | | |
|---|---|---|
| EP | 2173033 A | 4/2010 |
| EP | 2211463 A | 7/2010 |
| JP | 61-251230 A | 11/1986 |
| JP | 01-157128 A | 6/1989 |
| JP | 05-268002 A | 10/1993 |
| JP | 2000-209094 | 7/2000 |
| JP | 2001-292276 | 10/2001 |
| JP | 2002-033823 | 1/2002 |
| JP | 2002-544719 | 12/2002 |
| JP | 2007-183706 | 7/2007 |
| JP | 2008-092387 A | 4/2008 |
| JP | 2008-102418 A | 5/2008 |
| TW | 465228 | 11/2001 |
| WO | WO-00/69166 | 11/2000 |

OTHER PUBLICATIONS

Chinese Office Action, Application No. 201010217136.X, dated Nov. 29, 2013.

H. Abe, "Digital Circuit Simulation," Interface, Oct. 1, 1989, vol. 15, No. 10, pp. 212-218, CQ Publication.

Taiwanese Office Action (Application No. 099120449) dated Jan. 14, 2015.

* cited by examiner

FIG. 10
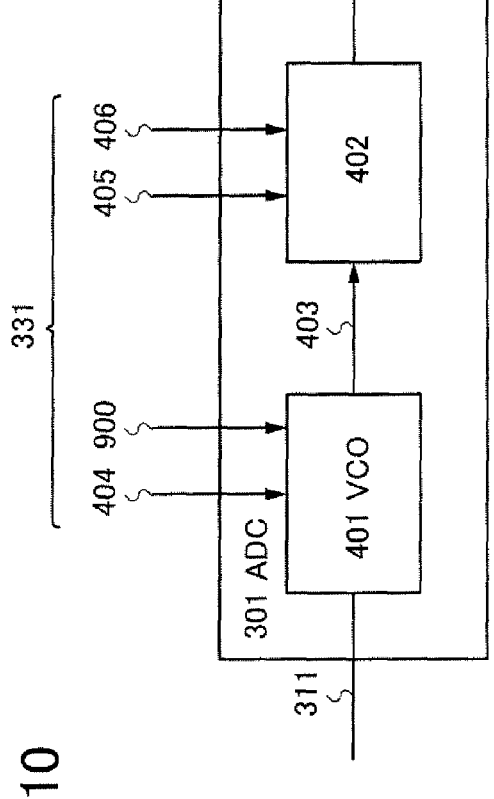
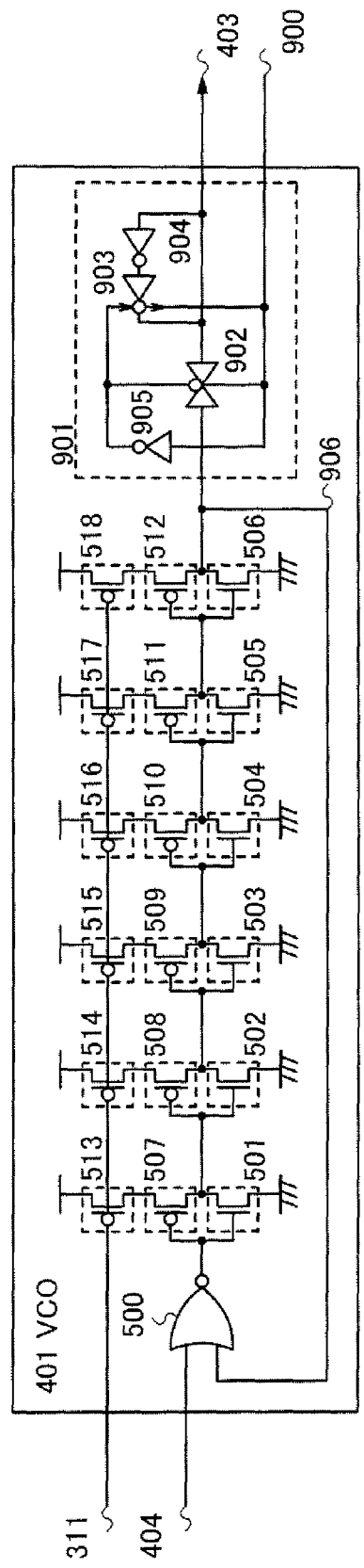

TOUCH PANEL AND DRIVING METHOD OF THE SAME

BACKGROUND OF THE INVENTION

1. Field of the Invention

The present invention relates to a touch panel including a touch sensor and a driving method thereof. In particular, the present invention relates to a touch panel in which pixels each provided with a touch sensor are arranged in a matrix and a method for driving the touch panel. Further, the present invention relates to electronic devices including the touch panel.

2. Description of the Related Art

In recent years, a display device provided with a touch sensor has attracted attention. The display device provided with the touch sensor is called a touch panel, a touch screen, and the like (hereinafter simply referred to as a "touch panel"). Examples of the touch sensor include a resistive touch sensor, a capacitance touch sensor, and an optical touch sensor, which are different from each other in operation principle. In any of the sensors, an object to be detected is in contact with a display device or in the vicinity of the display device, whereby data can be input.

By providing of a sensor (also referred to as a "photo sensor") that detects light as an optical touch sensor for a touch panel, a display screen serves as an input region. As an example of a device including such an optical touch sensor, a display device having an image capturing function, which is provided with a contact area sensor that captures an image, is given (e.g., see Patent Document 1). In the case of a touch panel including an optical touch sensor, light is emitted from a touch panel. In the case where an object to be detected exists at a given position of the touch panel, light at the region where the object to be detected exists is blocked by the object to be detected, and part of light is reflected. A photo sensor (also referred to as a "photoelectric conversion element") which can detect light is provided in a pixel of the touch panel, and the photo sensor detects the reflected light, so that the existence of the object to be detected in the region where light is detected can be recognized.

In addition, providing of a personal authentication function or the like for an electronic device such as a mobile phone or a portable information terminal has been attempted (for example, see Patent Document 2). A finger print, a face, a hand print, a palm print, a pattern of a hand vein, and the like are used for personal authentication. In the case where a portion different from the display portion has a personal authentication function, the number of components increases, and the weight or price of the electronic device could possibly increase.

In addition, in touch sensor systems, a technique for selecting an image processing method by which the position of a finger-tip is detected in accordance with brightness of external light has been known (for example, see Patent Document 3).

REFERENCE

Patent Document

[Patent Document 1] Japanese Published Patent Application No. 2001-292276

[Patent Document 2] Japanese Published Patent Application No. 2002-033823

[Patent Document 3] Japanese Published Patent Application No. 2007-183706

SUMMARY OF THE INVENTION

When a touch panel is used for an electronic device having a personal authentication function, electrical signals which are generated by photo sensors provided in respective pixels of the touch panel by detecting light are collected and image processing needs to be performed. In particular, a large amount of data obtained by a number of photo sensors needs to be efficiently collected in order to realize an electronic device with a personal authentication function of high resolution and high-speed operation. In addition, in order to realize a high degree of personal authentication function, it is necessary to collect data not in monochrome but in color, and further, with high-level gray scale. In addition, since the electrical signals generated by photo sensors are analog signals, conversion from an analog signal to a digital signal (A/D conversion) is needed in order to perform image processing. That is, an A/D converter circuit with high throughput is required. However, if the circuit scale of the A/D converter circuit is increased in order to achieve high throughput, a display region of the touch panel becomes small. In addition, if power consumption of the A/D converter circuit is increased in order to achieve high throughput, power consumption of the touch panel is also increased.

In view of the above problems, it is an object of one embodiment of the disclosed invention to provide a touch panel including an A/D converter circuit with smaller circuit scale and a function of image shooting with high resolution and a driving method thereof. It is an object of one embodiment of the disclosed invention to provide a touch panel including an A/D converter circuit with smaller circuit scale and a function of image shooting with high-speed operation and a driving method thereof. It is an object of one embodiment of the disclosed invention to provide a touch panel including an A/D converter circuit with smaller circuit scale and a function of shooting with high-level gray scale and a driving method thereof. Further, it is an object of one embodiment of the present invention to provide a touch panel in which power consumption can be suppressed and a driving method thereof.

A first structure of a touch panel in one embodiment of the present invention includes a display element and a photo sensor in each pixel, an A/D converter corresponding to each of a plurality of pixels, and a reading circuit of the photo sensor. The A/D converter includes an oscillation circuit configured to change an oscillation frequency in accordance with an output voltage generated in the reading circuit and a counter circuit configured to use an output signal from the oscillation circuit as a clock signal. The discrete value of the counter circuit which is based on the output voltage of the reading circuit is used as an output value of the A/D converter. When the output value of the A/D converter is determined, the output voltage of the reading circuit is changed and oscillation of the oscillation circuit is stopped so that the output value of the A/D converter is stabilized.

In addition, the touch panel in one embodiment of the present invention has a structure in which an output signal does not have a toggle when oscillation of the oscillation circuit stops in addition to the first structure, so that output of the oscillation circuit can be used as the least significant bit of an output value of the A/D converter.

A second structure of a touch panel in one embodiment of the present invention includes a display element and a photo sensor in each pixel and an A/D converter corresponding to each of a plurality of pixels. The A/D converter includes an oscillation circuit configured to change an oscillation frequency in accordance with an output voltage generated in a reading circuit of the photo sensor and a counter circuit configured to use an output signal from the oscillation circuit as a clock signal. The discrete value of the counter circuit which is based on an output voltage of the reading circuit is used as an output value of the A/D converter.

In addition, the touch panel in one embodiment of the present invention may further have a structure, in which the oscillation circuit includes a latch circuit for storing a potential of an output signal, in addition to the second structure. When the output value of the A/D converter is determined, the potential of the output signal of the oscillation circuit is stored in the latch circuit and the clock signal of the counter circuit is stopped, so that the output value of the A/D converter is stabilized.

In addition, the touch panel in one embodiment of the present invention may further have a structure in which an output signal does not have a toggle when the output signal of the oscillation circuit is stored in the latch circuit in addition to the second structure, so that the output value of the oscillation circuit can be used as the least significant bit of the output value of the A/D converter.

The present invention can provide a touch panel which can read images with high resolution and high-level gray scale at high-speed and low power consumption while a display region is secured. Alternatively, the present invention can provide a touch panel which is capable of image reading of high resolution and high-level gray scale at high speed and low power consumption and a driving method thereof. Alternatively, the present invention can provide a high-performance electronic device including the touch panel.

BRIEF DESCRIPTION OF THE DRAWINGS

FIG. 10 illustrates a structure of a touch panel.

DETAILED DESCRIPTION OF THE INVENTION

Figure 1:
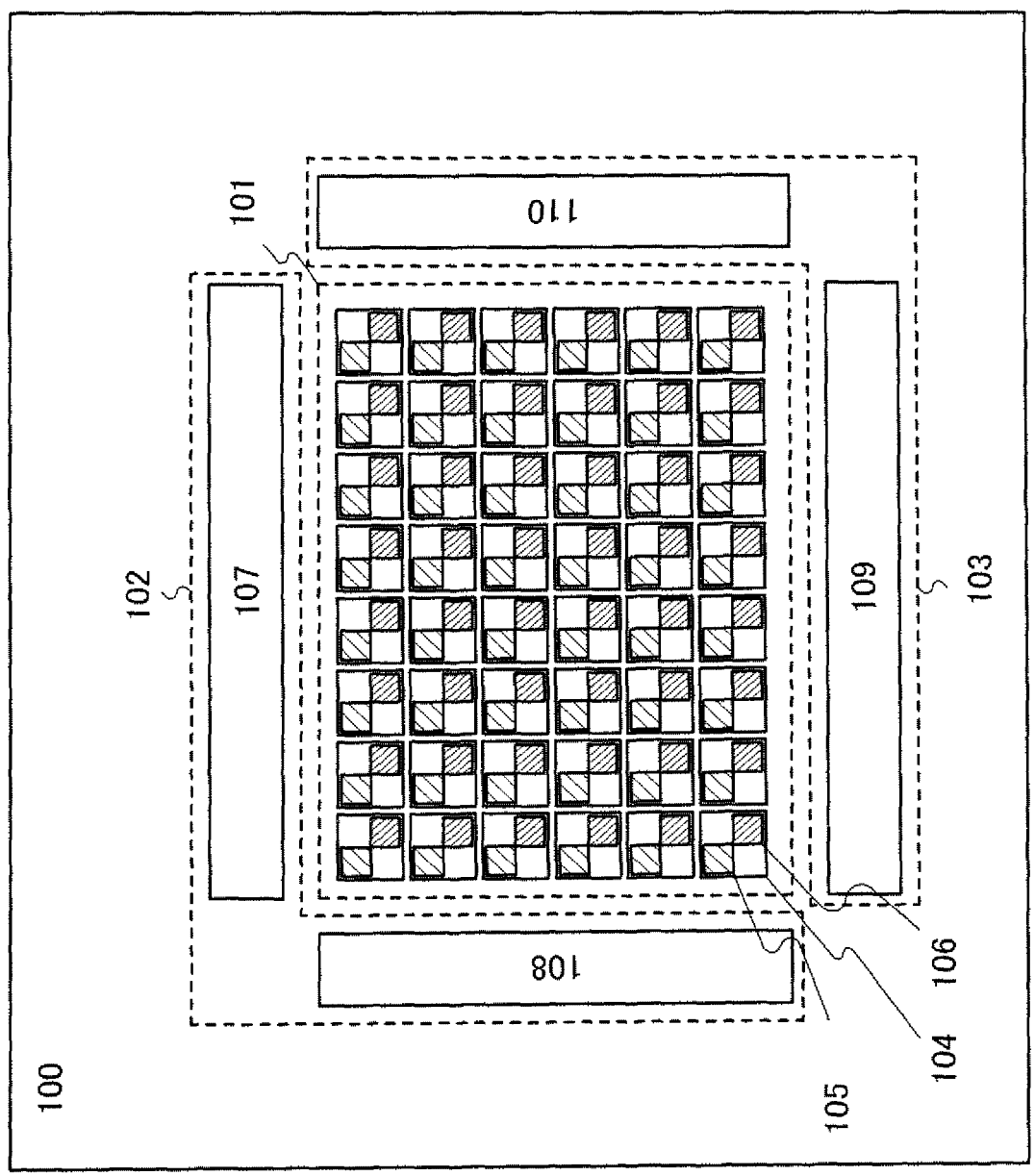
FIG. 1 illustrates a structure of a touch panel.

Hereinafter, embodiments will be described in detail with reference to the accompanying drawings. However, since embodiments described below can be embodied in many different modes, it is easily understood by those skilled in the art that the mode and the detail can be variously changed without departing from the scope of the present invention. Therefore, the present invention is not interpreted as being limited to the description of the embodiments below. In the drawings for explaining the embodiments, the same parts or parts having a similar function are denoted by the same reference numerals, and description of such parts is not repeated.

Embodiment 1

In this embodiment, a touch panel will be described with reference to FIG. 1, FIG. 2, FIG. 3, FIG. 4, FIG. 5, FIG. 6, FIG. 7, FIG. 8, FIG. 9, and FIG. 10.

A structure of the touch panel will be described with reference to FIG. 1. A touch panel 100 includes a pixel circuit 101, a display element control circuit 102, and a photo sensor control circuit 103. The pixel circuit 101 includes a plurality of pixels 104 arranged in a matrix of rows and columns. Each of the pixels 104 includes a display element 105 and a photo sensor 106.

Each of the display elements 105 includes a thin film transistor (TFT), a storage capacitor, a liquid crystal element including a liquid crystal layer, a color filter, and the like. Taking advantage of the change in the direction of a polarization due to a voltage application to the liquid crystal layer, contrast (gray scale) of light passing through the liquid crystal layer is made, so that image display is realized. Outside light or light from the rear side of a liquid crystal display device, which is emitted by a light source (a backlight) is used as the light passing through the liquid crystal layer. Further, the light which has passed through the liquid crystal layer passes through a color filter, so that a gray scale of a particular color (for example, red (R), green (G), or blue (B)) can be produced and a color image display is realized. The storage capacitor has a function of holding a charge that corresponds to the voltage which is applied to the liquid crystal layer. The thin film transistor has a function of controlling injection or discharge of charge to the storage capacitor.

Note that the case where each of the display elements 105 includes a liquid crystal element is described above; however, other elements such as a light emitting element may be included instead. The light emitting element is an element in which the luminance is controlled by current or voltage. Specifically, light emitting diode, OLED (organic light emitting diode), and the like are given.

The photo sensor 106 includes an element such as a photodiode, which has a function of generating an electrical signal when receiving light, and a thin film transistor. Note that as light which is received by the photo sensors 106, reflected light or transmitted light obtained when outside light or light from a backlight is delivered to an object to be detected can be used. Here, the pixels 104 which emit light of colors of red (R), green (G), and blue (B) by using a color filter are called an R pixel, a G pixel, and a B pixel, respectively. Note that a red (R) color component, a green (G) color component, and a blue (B) color component in reflected light or transmitted light obtained when outside light or light from a backlight is delivered to an object to be detected can be detected by photo sensors in an R pixel, a G pixel, and a B pixel, respectively.

The display element control circuit 102 controls the display elements 105 and includes a display element driver circuit 107, which inputs a signal to the display elements 105 through signal lines (also referred to as source signal lines) such as video data signal line, and a display element driver circuit 108 which inputs a signal to the display elements 105 through scanning lines (also referred to as gate signal lines). For example, the display element driver circuit 108 on the scanning line side has a function of selecting the display elements included in the pixels placed in a particular line.

Further, the display element driver circuit 107 on the signal line side has a function of giving a predetermined potential to the display elements 105 included in the pixels placed in the selected line. Note that in the display elements 105 to which the display element driver circuit 108 on the scanning line side applies high potential, the thin film transistors are brought into conduction and charges given by the display element driver circuit 107 on the signal line side are supplied to the display elements 105.

The photo sensor control circuit 103 controls the photo sensors 106 and includes a photo sensor reading circuit 109 such as a photo sensor output signal line and a photo sensor reference signal line on the signal line side and a photo sensor driver circuit 110 on the scanning line side. For example, the photo sensor driver circuit 110 on the scanning line side has a function of selecting the photo sensors 106 included in the pixels placed in a predetermined line. Further, the photo sensor reading circuit 109 on the signal line side has a function of taking out an output signal of the photo sensors 106 included in the pixels in the selected line.

Figure 2:
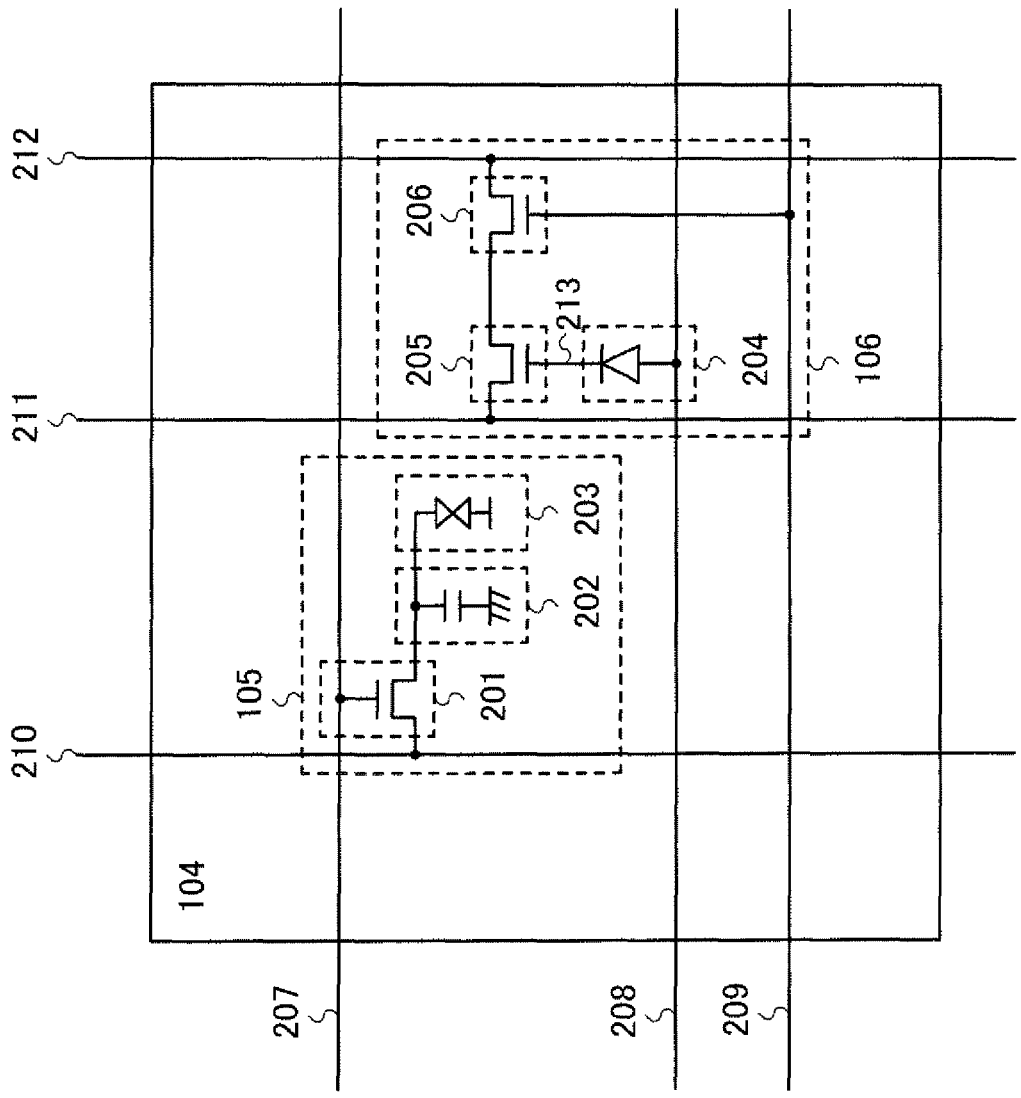
FIG. 2 illustrates a structure of a touch panel.

A circuit diagram of the pixel 104 will be described with reference to FIG. 2. The pixel 104 includes the display element 105 including a transistor 201, a storage capacitor 202, and a liquid crystal element 203, and the photo sensor 106 including a photodiode 204, a transistor 205, and a transistor 206.

A gate of the transistor 201 is electrically connected to a gate signal line 207, one of a source and a drain of the transistor 201 is electrically connected to a video data signal line 210, and the other of the source and the drain of the transistor 201 is electrically connected to one electrode of the storage capacitor 202 and one electrode of the liquid crystal element 203. The other electrode of the storage capacitor 202 and the other electrode of the liquid crystal element 203 are each held at a certain potential. The liquid crystal element 203 is an element including a pair of electrodes and a liquid crystal layer sandwiched between the pair of electrodes.

When a potential at the High level "H" is applied to the gate signal line 207, the transistor 201 applies the potential of the video data signal line 210 to the storage capacitor 202 and the liquid crystal element 203. The storage capacitor 202 holds the applied potential. The liquid crystal element 203 changes light transmittance in accordance with the applied potential.

One electrode of the photodiode 204 is electrically connected to a photodiode reset signal line 208, and the other electrode of the photodiode 204 is electrically connected to a gate of the transistor 205. One of a source and a drain of the transistor 205 is electrically connected to a photo sensor output signal line 211, and the other of the source and the drain of the transistor 205 is electrically connected to one of a source and a drain of the transistor 206. A gate of the transistor 206 is electrically connected to a gate signal line 209, and the other of the source and the drain of the transistor 206 is electrically connected to a photo sensor reference signal line 212.

Figure 3:
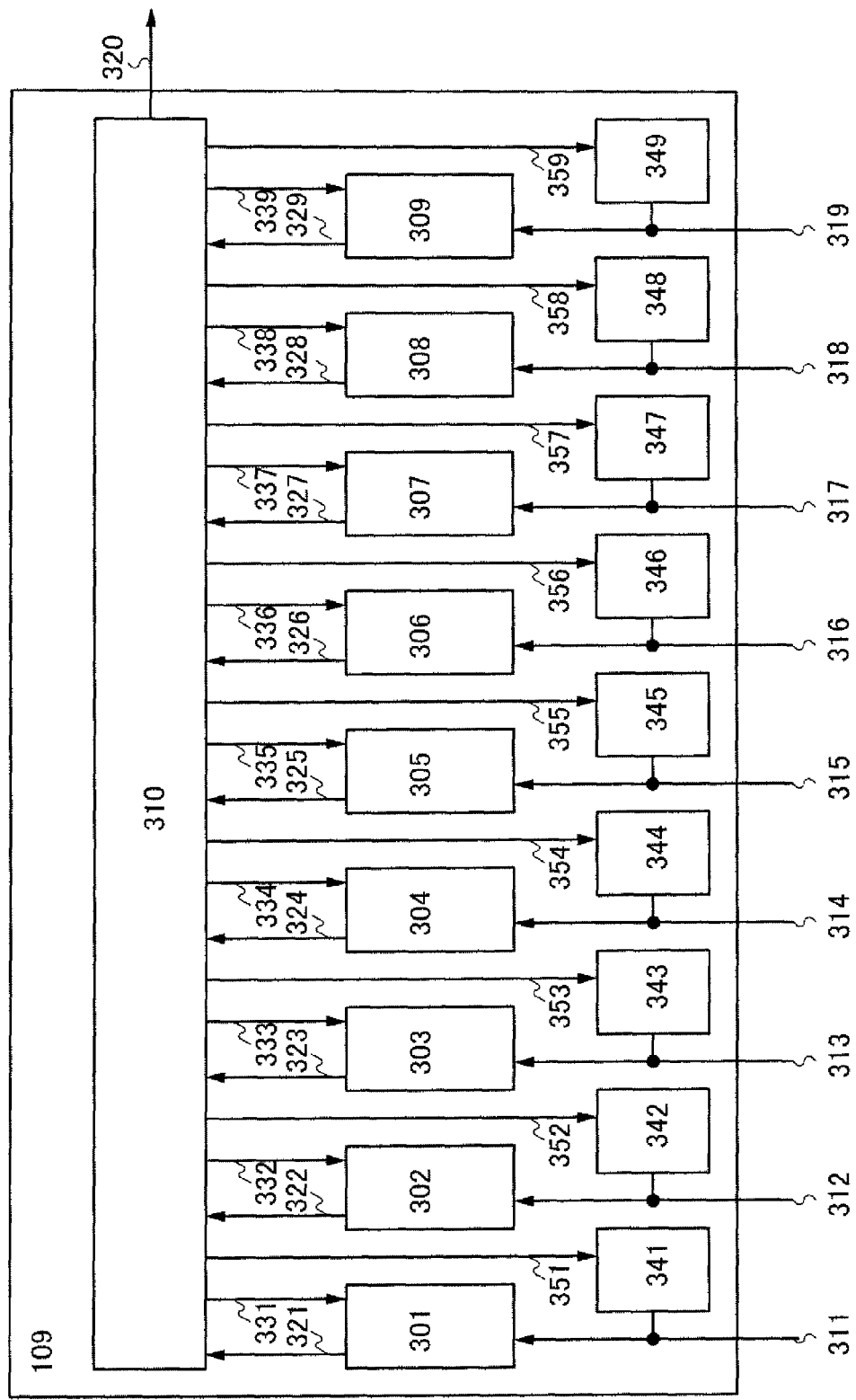
FIG. 3 illustrates a structure of a touch panel.
Figure 4:
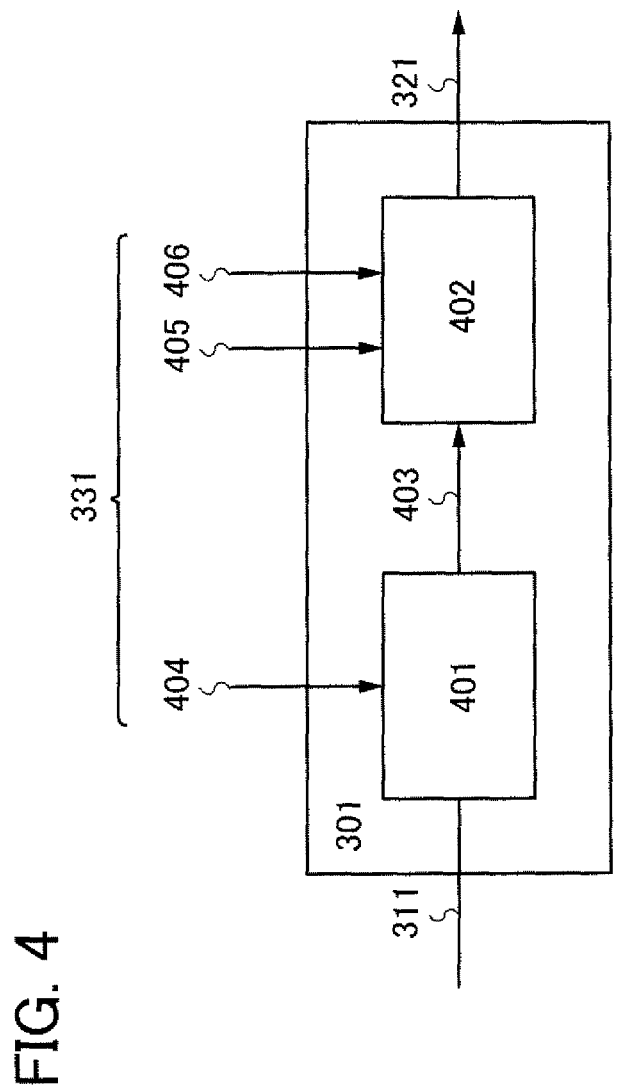
FIG. 4 illustrates a structure of a touch panel.

Next, the structure of the photo sensor reading circuit 109 will be described with reference to FIG. 3.

The photo sensor reading circuit 109 includes a first A/D converter (hereinafter referred to as a first ADC) 301 to a ninth ADC 309; an ADC control circuit 310; a first spare reading circuit 341 to a ninth spare reading circuit 349; a first photo sensor signal line 311 to a ninth photo sensor signal line 319; an output signal line 320 of the photo sensor reading circuit 109; a first ADC output signal line 321 to a ninth ADC output signal line 329; a first ADC control signal line 331 to a ninth ADC control signal line 339; and a first spare reading circuit control signal line 351 to a ninth spare reading circuit control signal line 359. Specifically, the first photo sensor signal line 311 to the ninth photo sensor signal line 319 are connected to the respective photo sensor output signal lines 211 each included in the pixels 104 in one column in the pixel circuit 101.

The ADC control circuit 310 generates a potential to be output to the output signal line 320 of the photo sensor reading circuit 109 based on the potential of each of the first ADC output signal line 321 to the ninth ADC output signal line 329. Specifically, one of the first ADC output signal line 321 to the ninth ADC output signal line 329 is selected and the potential of the selected signal line is output to the output signal line 320. In addition, the ADC control circuit 310 generates a potential to be output to each of the first ADC control signal line 331 to the ninth ADC control signal line 339 and a potential output to each of the first spare reading circuit control signal line 351 to the ninth spare reading circuit control signal line 359.

Next, the structure and operation of the first ADC 301 to the ninth ADC 309 will be specifically described. As a representative example, a structure of the first ADC 301 will be described below with reference to FIG. 4.

The first ADC 301 includes a voltage control oscillation circuit (hereinafter referred to as a VCO) 401 and a counter circuit 402. In the VCO 401, the cycle of a toggle of the potential of an output signal at the High level "H" and the potential of the output signal at the Low level "L" (the cycle of change from "H" to "L" or "L" to "H") varies in accordance with the potential of the first photo sensor signal line 311. An output signal from the VCO 401 is output to the output signal line 403. Here, half the number of toggles per unit time is the oscillation frequency of the VCO 401. In addition, regardless of the potential of the first photo sensor signal line 311, an output signal from the VCO 401 can have a fixed value by a stop signal transmitted from a stop signal line 404. For example, when the stop signal is at "H", the output signal can be at "L".

The counter circuit 402 operates using an output signal from the VCO 401 as a clock signal. The discrete value of the counter circuit 402 is increased in accordance with the oscillation frequency of the VCO 401. The discrete value of the counter circuit 402 can be set to an initial value by a reset signal transmitted from a reset signal line 405. For example, when the reset signal is at "H", the initial value can be "0". In addition, the discrete value of the counter circuit 402 is output as a digital value to the first ADC output signal line 321 in accordance with a set signal transmitted from a set signal line 406. For example, the discrete value of the counter circuit 402 at the time of when the level of the set signal is changed from "L" to "H" can be output as a digital signal to the first ADC output signal line 321.

Note that the stop signal line 404, the reset signal line 405, and the set signal line 406 correspond to the first ADC control signal line 331.

Here, if the oscillation frequency of the VCO 401 is low (or high) when the potential of the first photo sensor signal line 311 is high (or low), the discrete value within a predetermined period is small (or large) because the counter circuit 402 is operated by a clock signal with a low (or high) frequency. Thus, a digital value output to the first ADC output signal line 321 is small (or large). In other words, the digital signal based on the potential of the first photo sensor signal line 311 which is an analog value is output; A/D conversion is performed.

Next, an example of the VCO 401 and the counter circuit 402 is described with reference to FIG. 5. The VCO 401 in FIG. 5 includes a NOR circuit 500, a first n-channel TFT 501 to a sixth n-channel TFT 506, and a first p-channel TFT 507 to a twelfth p-channel TFT 518. The lower the potential of the first photo sensor signal line 311 becomes, the higher the oscillation frequency of the VCO 401 in FIG. 5 becomes. In addition, when the stop signal line 404 is set at "H", an output signal is at "L" regardless of the potential of the first photo sensor signal line 311. Note that the first n-channel TFT 501, the first p-channel TFT 507, and the seventh p-channel TFT 513 constitute a first voltage control NOT circuit. By controlling the gate voltage of the seventh p-channel TFT 513 in accordance with the potential of the first photo sensor signal line 311, the driving capability of the seventh p-channel TFT 513 is changed, whereby a delay time in the first voltage control NOT circuit is changed. Similarly, a second voltage control NOT circuit to a sixth voltage control NOT circuit include the second n-channel TFT 502 to the sixth n-channel TFT 506, the second p-channel TFT 508 to the sixth p-channel TFT 512, and the eighth p-channel TFT 514 to the twelfth p-channel TFT 518, respectively.

Figure 5:
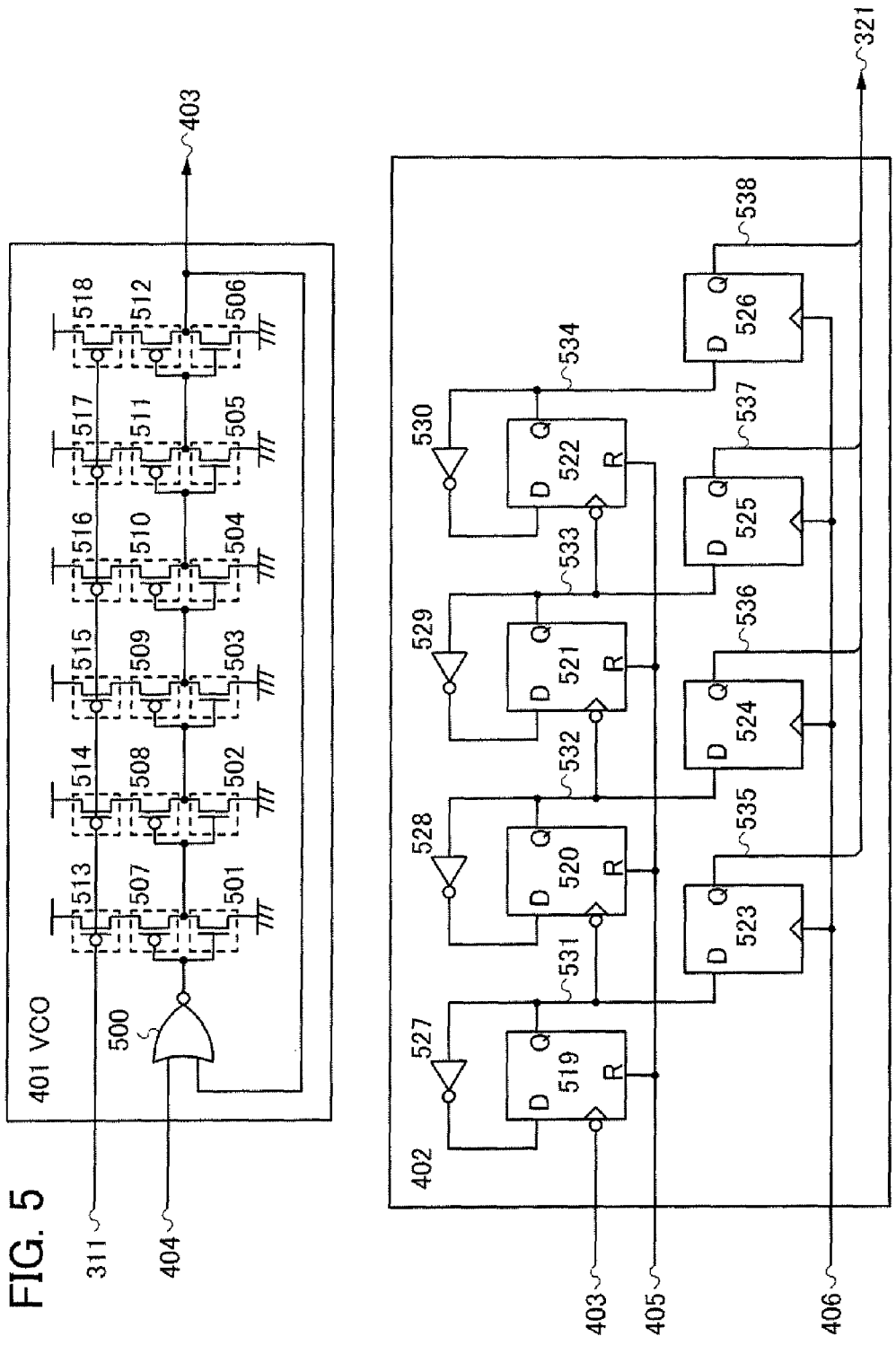
FIG. 5 illustrates a structure of a touch panel.

Note that in FIG. 5, although the VCO 401 includes seven stages of the NOR circuit 500 and the first voltage control NOT circuit to the sixth voltage control NOT circuit, the VCO can have a different number of stages as long as an odd number of stages are provided. In addition, in the case where the VCO has a structure in which the higher the potential of the first photo sensor signal line 311 becomes, the higher the oscillation frequency of the VCO becomes, a voltage control NOT circuit may have a structure in which the gate voltage of an n-channel TFT is controlled in accordance with the potential of the first photo sensor signal line 311. Further, by replacing the NOR circuit with a NAND circuit, a VCO can have a structure in which an output signal is at "H" when the stop signal line 404 is set at "L" regardless of the potential of the first photo sensor signal line 311.

On the other hand, the counter circuit 402 in FIG. 5 includes a first reset flip-flop 519 to a fourth reset flip-flop 522, a first flip-flop 523 to a fourth flip-flop 526, and a first NOT circuit 527 to a fourth NOT circuit 530. The first reset flip-flop 519 to the fourth reset flip-flop 522 and the first NOT circuit 527 to the fourth NOT circuit 530 constitute 4-bit non-synchronous counter. Values in a zeroth bit to a third bit of the discrete value of the non-synchronous counter are output to signal lines 531 to 534. The discrete value of the non-synchronous counter is set to an initial value of "0000" by setting the reset signal line 405 at "H". In addition, the non-synchronous counter operates using an output signal from the VCO 401 supplied through the output signal line 403 as a clock signal.

When the level of the potential of the set signal line 406 is changed from "L" to "H", the discrete value of the non-synchronous counter is stored in the first flip-flip 523 to the fourth flip-flop 526 and is output to a zeroth bit signal line 535 to a third bit signal line 538 as a digital value. Note that the zeroth bit signal line 535 to the third bit signal line 538 constitute the first ADC output signal line 321.

Note that in FIG. 5, although the counter circuit 402 includes the 4-bit non-synchronous counter and the 4-bit flip-flops, a given number of bits can be employed for the counter circuit. In addition, instead of the non-synchronous counter, a synchronous counter can be employed. Since the number of flip-flops which operate at high speed can be reduced with the use of the non-synchronous counter, it is suitable for reduction in power consumption. In addition, although a structure in which the flip-flop configured to operate with a rising edge of a set signal, that is, with a change of the level of the potential of the set signal line 406 from "L" to "H" is employed in order to obtain the discrete value of a counter, a structure in which the flip-flop which operate with a falling edge can be employed. Alternatively, a structure in which a level sensitive latch operates when the set signal is at "H" or "L" may be employed.

Next, a structure of the first spare reading circuit 341 to the ninth spare reading circuit 349 is described. The structure of the first spare reading circuit 341 is described below as a typical example with reference to FIG. 6. The first spare reading circuit 341 illustrated in FIG. 6 includes a p-channel TFT 601 and a storage capacitor 602.

Figure 6:
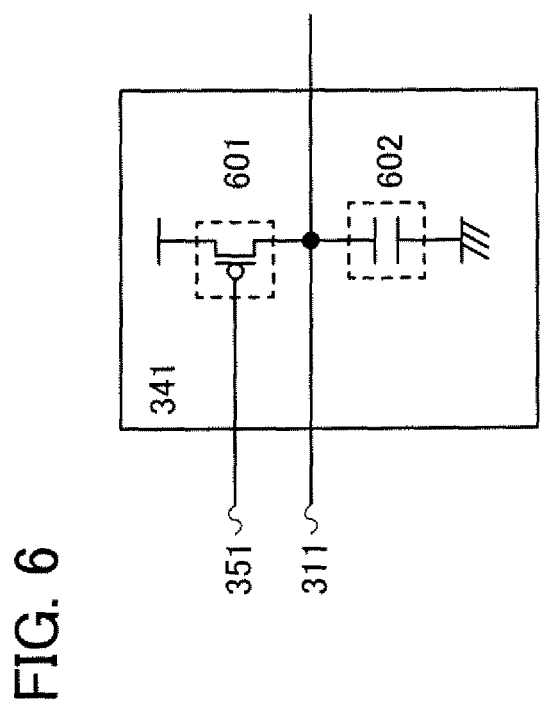
FIG. 6 illustrates a structure of a touch panel.

In the first spare reading circuit 341, the potential of the photo sensor signal line is set to a reference potential before operation of a photo sensor in a pixel. In FIG. 6, by setting the first spare reading circuit control signal line 351 at "L", the first photo sensor signal line 311 can be set to have a high potential which is a reference potential. Note that the storage capacitor 602 is not necessarily provided in the case where the parasitic capacitance of the first photo sensor signal line 311 is high. Note that the reference potential can be a low potential. In that case, an n-channel TFT is used instead of the p-channel TFT 601 and the first spare reading circuit control signal line 351 is set at "H", whereby the first photo sensor signal line 311 can be set to have a low potential which is a reference potential.

Figure 7:
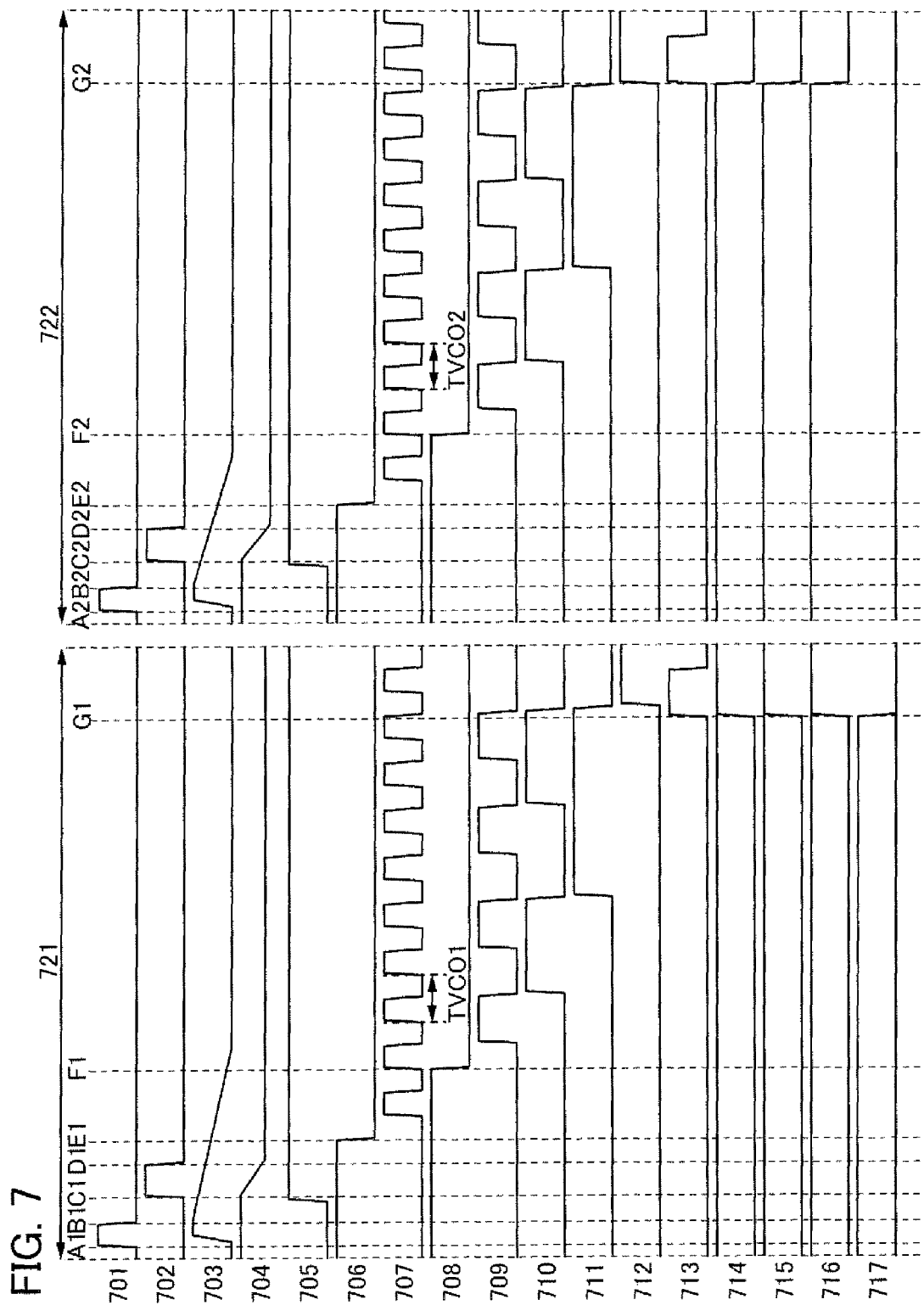
FIG. 7 illustrates a timing chart.

Next, reading operation of a photo sensor in this touch panel is described with reference to a timing chart in FIG. 7. In FIG. 7, a signal 701 corresponds to the potential of the photodiode reset signal line 208; a signal 702 corresponds to the potential of the gate signal line 209 to which the gate of the transistor 206 is connected; a signal 703 corresponds to the potential of a gate signal line 213 to which the gate of the transistor 205 is electrically connected; and a signal 704 corresponds to the potential of the photo sensor output signal line 211 in FIG. 2. In addition, the signal 705 corresponds to the potential of the spare reading circuit control signal line 351 in FIG. 6. Further, signals 706 to 717 correspond to the potential of the stop signal line 404, the potential of the output signal line 403 of the VCO, the potential of the reset signal line 405, the potential of the signal line 531, the potential of the signal line 532, the potential of the signal line 533, the potential of the signal line 534, the potential of the set signal line 406, the potential of the zeroth signal line 535, the potential of the first signal line 536, the potential of the second signal line 537, and the potential of the third bit signal line 538 in FIG. 5, respectively.

Here, the case where light delivered to a photodiode is more intense in a second period 722 than that in a first period 721 is described. Note that the oscillation cycles of the VCO 401 are TV CO1 and TV CO2 in the first period 721 and the second period 722, respectively. Thus, the oscillation frequencies are 1/TVCO1 and 1/TVCO2 in the first period 721 and the second period 722, respectively. Here, TVCOI is longer than TVCO2.

First, the first period 721 is described. In a time A1, when the potential of the photodiode reset signal line 208 (signal 701) is at "H", the photodiode 204 is brought into conduction and the potential of the gate signal line 213 (signal 703) to which the gate of the transistor 205 is connected is at "H". In addition, when the potential of the spare reading circuit control signal line 351 (signal 705) is at "L", the potential of the photo sensor output signal line 211 (signal 704) is precharged with "H".

In a time B1, when the potential of the photodiode reset signal line 208 (signal 701) is at "L", the potential of the gate signal line 213 to which the gate of the transistor 205 is connected (signal 703) is lowered because of off current of the photodiode 204. The off current of the photodiode 204 increases when light is delivered to the photodiode 204; therefore, the potential of the gate signal line 213 to which the gate of the transistor 205 is connected (signal 703) varies in accordance with the amount of the light delivered to the photodiode 204. That is, current between a source and a drain of the transistor 205 varies.

In a time C1, when the potential of the gate signal line 209 (signal 702) is at "H", the transistor 206 is brought into conduction and electrical continuity is established between the photo sensor reference signal line 212 and the photo sensor output signal line 211 through the transistor 205 and the transistor 206. Then, the potential of the photo sensor output signal line 211 (signal 704) is decreased. Note that before the time C1, the potential of the spare reading circuit control signal line 351 (signal 705) is set at "H" and precharge of the photo sensor output signal line 211 is completed. Here, the rate at which the potential of the photo sensor output signal line 211 (signal 704) decreases depends on the current between the source and the drain of the transistor 205. That is, the rate of decreasing the potential of the photo sensor output signal line 211 varies in accordance with the amount of light which is delivered to the photodiode 204.

In a time D1, when the potential of the gate signal line 209 (signal 702) is at "L", the transistor 206 is turned off, whereby the potential of the photo sensor output signal line 211 (signal 704) is kept at a fixed value after the time D1.

In a time E1, when the potential of the stop signal line 404 (signal 706) is set from "H" to "L", the VCO 401 start oscillating at an oscillation frequency which is based on the potential of the photo sensor output signal line 211 (signal 704) and the output signal becomes like a signal 707.

In a time F1, when the potential of the reset signal line 405 (signal 708) is set from "H" to "L", the non-synchronous counter starts counting. Note that when the potential of the reset signal line 405 is at "H", the non-synchronous counter is set to the initial value "0000"; therefore, the potentials of the signal lines 531 to 534 (signal 709 to 712) are all set to "L". Note that by making timing of when the potential of the reset signal line 405 (signal 708) is set from "H" to "L" come at the same time as or earlier than timing of when the potential of the stop signal line 404 (signal 706) is set from "H" to "L", a period during which the non-synchronous counter counts can be made longer. Therefore, an ADC with a high throughput can be achieved, which is preferable.

In a time G1, when the potential of the set signal line 406 (signal 713) is set from "L" to "H", the discrete values of the non-synchronous counter, that is, the values of the signal lines 531 to 534 are stored in the first flip-flop 523 to the fourth flip-flop 526, whereby the potentials of the zeroth bit signal line 535 to the third bit signal line 538 (signals 714 to 717) vary. Here, the potentials of the zeroth bit signal line 535 to the third bit signal line 538 are "H", "H", "H", and "L", respectively. They are "7" in decimal notation.

Next, the second period 722 is described. Signals in times A2, B2, C2, D2, E2, and F2 differ from the signals in the times A1, B1, C1, D1, E1, and F1 in the intensity of light delivered to the photodiode. Specifically, since the intensity of light in the second period 722 is high, the potential of the gate signal line 213 to which the gate of the transistor 205 is connected (signal 703) is reduced more quickly after the time B2 than that after the time B1. Thus, the potential of the photo sensor output signal line 211 (signal 704) in the time D2 is lower than that in the time D1. Therefore, the oscillation frequency of the output signal of the VCO 401 (signal 707) after the time E2 is higher than that after the time E1.

On the other hand, in the time G2, when the potential of the set signal line 406 (signal 713) is set from "L" to "H", the discrete values of the non-synchronous counter, that is, the values of the signal lines 531 to 534 are stored in the first flip-flop 523 to the fourth flip-flop 526, whereby the potentials of the zeroth bit signal line 535 to the third bit signal line 538 (signals 714 to 717) vary. Here, the potentials of the zeroth bit signal line 535 to the third bit signal line 538 are "L", "L", "L", and "L", respectively. They are "0" in decimal notation.

Thus, although light delivered to the photodiode is intense, an output value of the ADC in the second period 722 is smaller than that in the first period 721, which is incoherence. A cause of such malfunction can be described below. In the case of the structure illustrated in FIG. 5, a clock signal that drives the non-synchronous counter, that is, the output signal of the VCO 401 (signal 707) does not synchronize with the set signal supplied from the set signal line 406 (signal 713). Therefore, there is a possibility that the discrete values of the non-synchronous counter are stored in the first flip-flop 523 to the fourth flip-flop 526 while the discrete values are changing. In that case, wrong data is output to the first ADC output signal line 321.

In view of this, a first structure according to one embodiment of the present invention discloses the following driving method: the photo sensor output signal line 211 is precharged just before the discrete values of the non-synchronous counter are stored in the first flip-flop 523 to the fourth flip-flop 526. The driving method is described with reference to FIG. 8.

Figure 8:
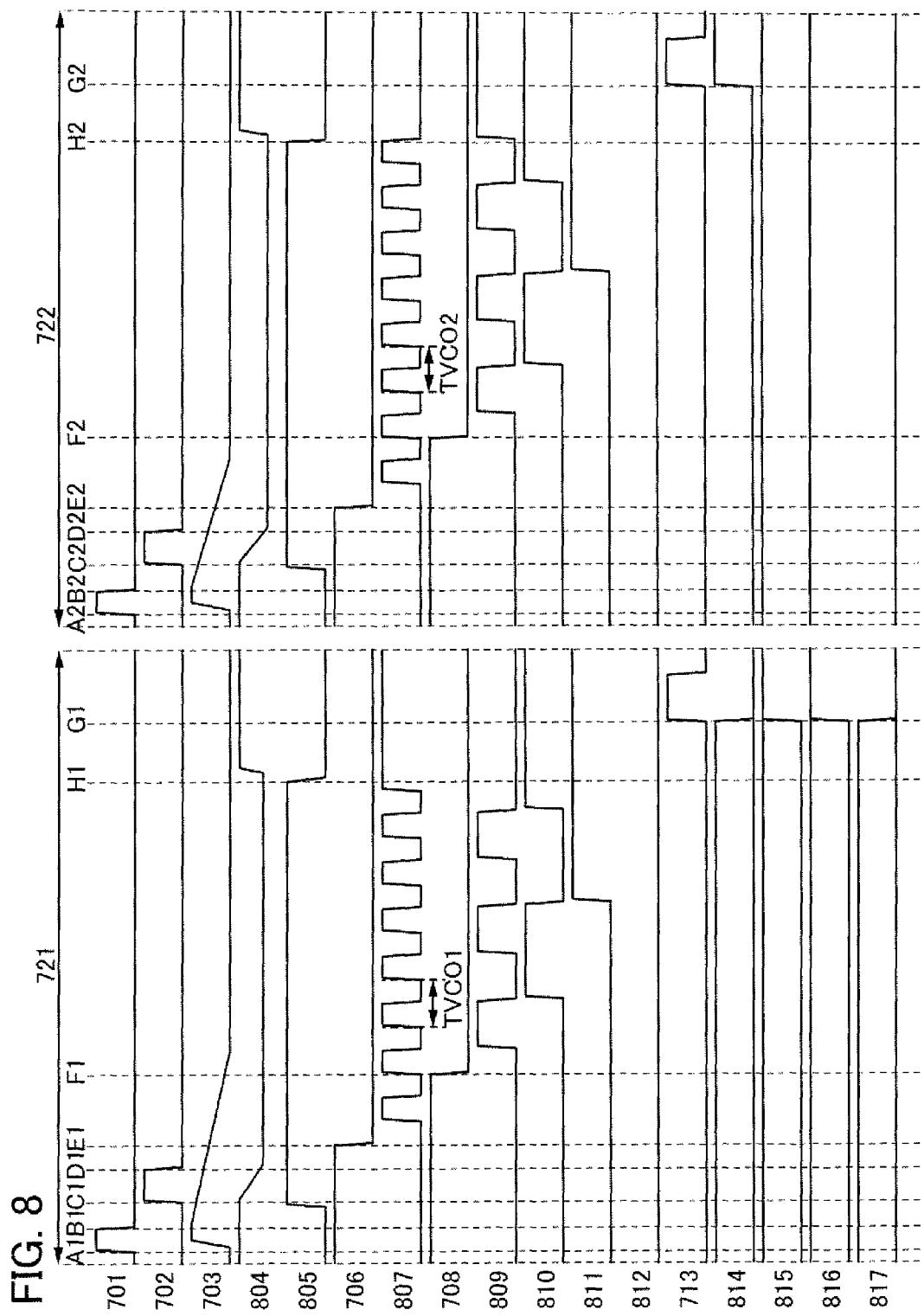
FIG. 8 illustrates a timing chart.

FIG. 8 is different from FIG. 7 in that the potential of the spare reading circuit control signal line 351 (signal 805) is set at "L" and the photo sensor output signal line 211 is precharged in a time H1 and a time H2. At that time, the potential of the photo sensor output signal line 211 is similar to that of a signal 804. When the photo sensor output signal line 211 is precharged, the oscillation of the VCO 401 stops; thus, the potential of the output signal line 403 is kept as a value just before the time H1 and the time H2 like the signal line 807.

Next, in the time G1 and the time G2, the potential of the set signal line 406 (signal 713) is set from "L" to "H" and the discrete value of the non-synchronous counter, that is, the potentials of the signal lines 531 to 534 (signals 809 to 812) are stored in the first flip-flop 523 to the fourth flip-flop 526. In the first period 721, the potentials of the zeroth bit signal line 535 to the third bit signal line 538 (signals 814 to 817) are "L", "H", "H", and "L", respectively. They are "6" in decimal notation. On the other hand, in the second period 722, the potentials of the zeroth bit signal line 535 to the third bit signal line 538 (signals 814 to 817) are "H", "H", "H", and "L", respectively. They are "7" in decimal notation. That is, an output value of the ADC in the second period 722 in which light delivered to photo diode is intense is smaller than that in the first period 721, which means that a correct result is obtained.

Alternatively, a second structure according to one embodiment of the present invention discloses a driving method illustrated in FIG. 10. A latch signal line 900 is additionally provided for the first ADC 301. Note that the latch signal line 900, the stop signal line 404, the reset signal line 405, and the set signal line 406 correspond to the first ADC control signal line 331. In addition, a latch circuit 901 is additionally provided for the VCO 401. Here, an example in which the latch circuit 901 includes an analog switch 902, a clocked inverter 903, an inverter 904, and an inverter 905 is illustrated.

When the potential of the latch signal line 900 is at "H", the latch circuit 901 outputs the potential of the signal line 906 as the potential of the output signal line 403. In addition, when the potential of the latch signal line 900 is "L", as the potential of the output signal line 403, the latch circuit 901 outputs the potential of the signal line 906 at the time of when the potential of the latch signal line 900 is set from "H" to "L".

Figure 9:
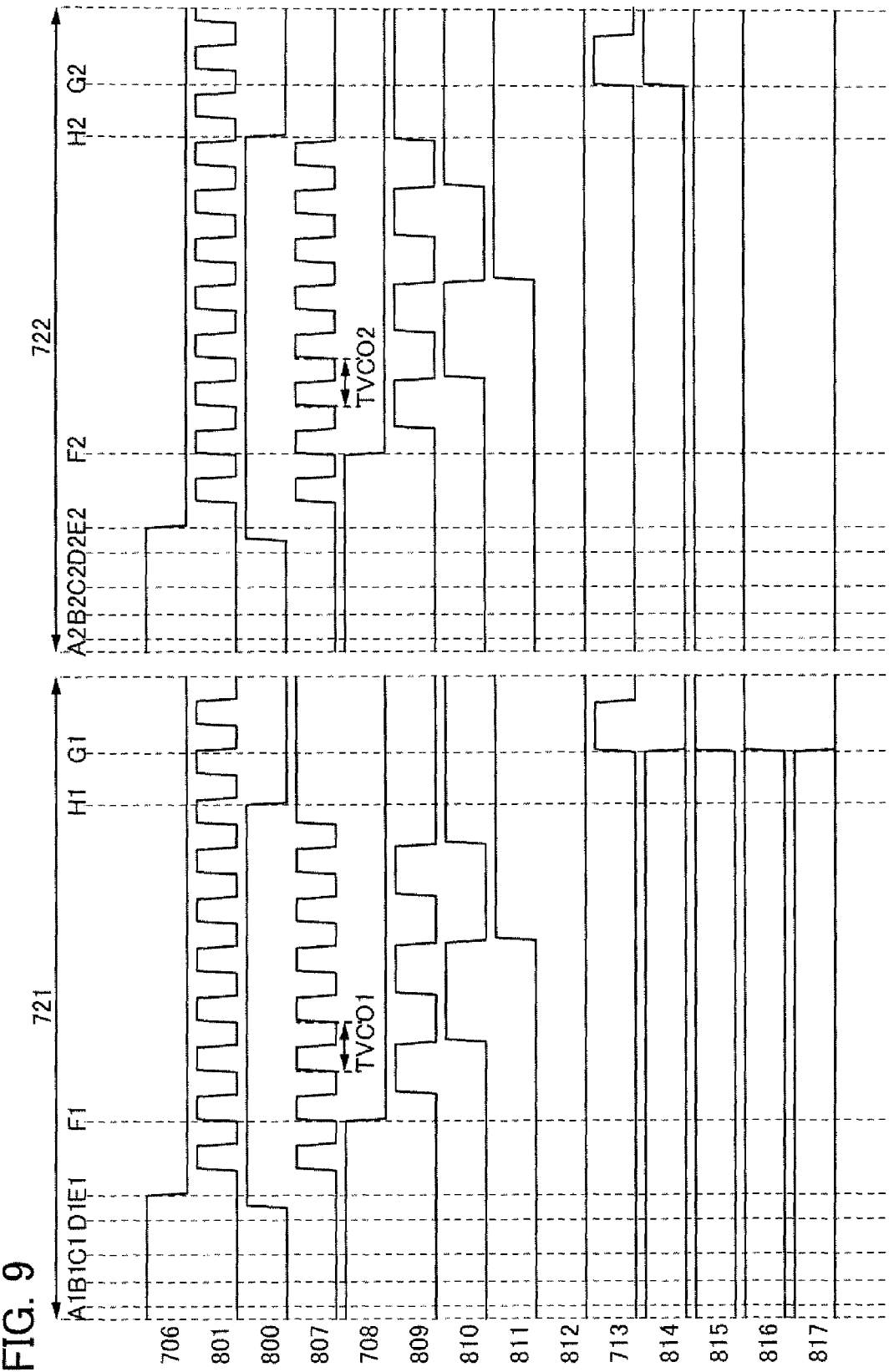
FIG. 9 illustrates a timing chart.

Here, the potential of the latch signal line 900 is set at "L" just before the discrete values of the non-synchronous counter are stored in the first flip-flop 523 to the fourth flip-flop 526. The driving method is described with reference to FIG. 9. Since signals in FIG. 9 are similar to the signals 701 to 705 to in FIG. 7, they are omitted. In addition, FIG. 9 includes the potential of the latch signal line 900 (signal 800) and the potential of the signal line 906 (signal 801) added to the chart in FIG. 7.

In FIG. 9, the potential of the latch signal line (signal 800) is set at "H" before the time E1 and the time E2, i.e., before the potential of the stop signal line 404 (signal 706) is set from "H" to "L" and the VCO 401 oscillates.

Next, by setting the potential of the latch signal line 900 (signal 800) at "L" in the time H1 and the time H2, the potential of the output signal line 403 (signal 807) is kept as the same value as the potential of the signal line 906 (signal 801) just before the time H1 and the time H2.

Next, in the time G1 and the time G2, the potential of the set signal line 406 (signal 713) is set from "L" to "H" and the discrete value of the non-synchronous counter, that is, the potentials of the signal lines 531 to 534 (signals 809 to 812) are stored in the first flip-flop 523 to the fourth flip-flop 526. In the first period 721, the potentials of the zeroth bit signal line 535 to the third bit signal line 538 (signals 814 to 817) are "L", "H", "H", and "L", respectively. They are "6" in decimal notation. On the other hand, in the second period 722, the potentials of the zeroth bit signal line 535 to the third bit signal line 538 (signals 814 to 817) are "H", "H", "H", and "L", respectively. They are "7" in decimal notation. That is, an output value of the ADC in the second period 722 in which light delivered to photo diode is intense is smaller than that in the first period 721, which means that a correct result is obtained.

Note that by employing the driving method illustrated by the timing chart in FIG. 8 or FIG. 9, an output signal of the VCO 401 can be used as the least significant bit of the non-synchronous counter. In that case, since the number of bits can be increased without providing an additional circuit, an ADC with high accuracy and low power consumption can be achieved, which is preferable. Further, by making timing of when the potential of the reset signal line 405 (signal 708 in FIG. 8 or FIG. 9) is set from "H" to "L" come at the same time as or earlier than timing of when the potential of the stop signal line 404 (signal 706 in FIG. 8 or FIG. 9) is set from "H" to "L", the least significant bit, that is, an output signal of the VCO 401 is set at "L" as an initial value and set at "H" after approximately half a cycle (TYCO/2); therefore, accuracy of the ADC can be increased.

In one embodiment of the present invention, since the A/D converter including the VCO and the counter circuit is used, a circuit scale can be made small as compared to the case where a successive-comparison type A/D converter including a comparison circuit, a register circuit, and a D/A converter circuit is used, for example. In other words, a display region of a touch panel can be secured. In addition, in the case where on output of the VCO is used as the least significant bit of the counter, the A/D converter with low power consumption and a high throughput can be achieved. Therefore, a touch panel can be provided which is capable of image reading of high resolution and high-level gray scale at high speed with low power consumption while a display region is secured. In addition, a driving method of a touch panel of high performance can be provided.

Embodiment 2

In this embodiment, a cross-sectional structure of a touch panel in one embodiment of the present invention is described.

Figure 11:
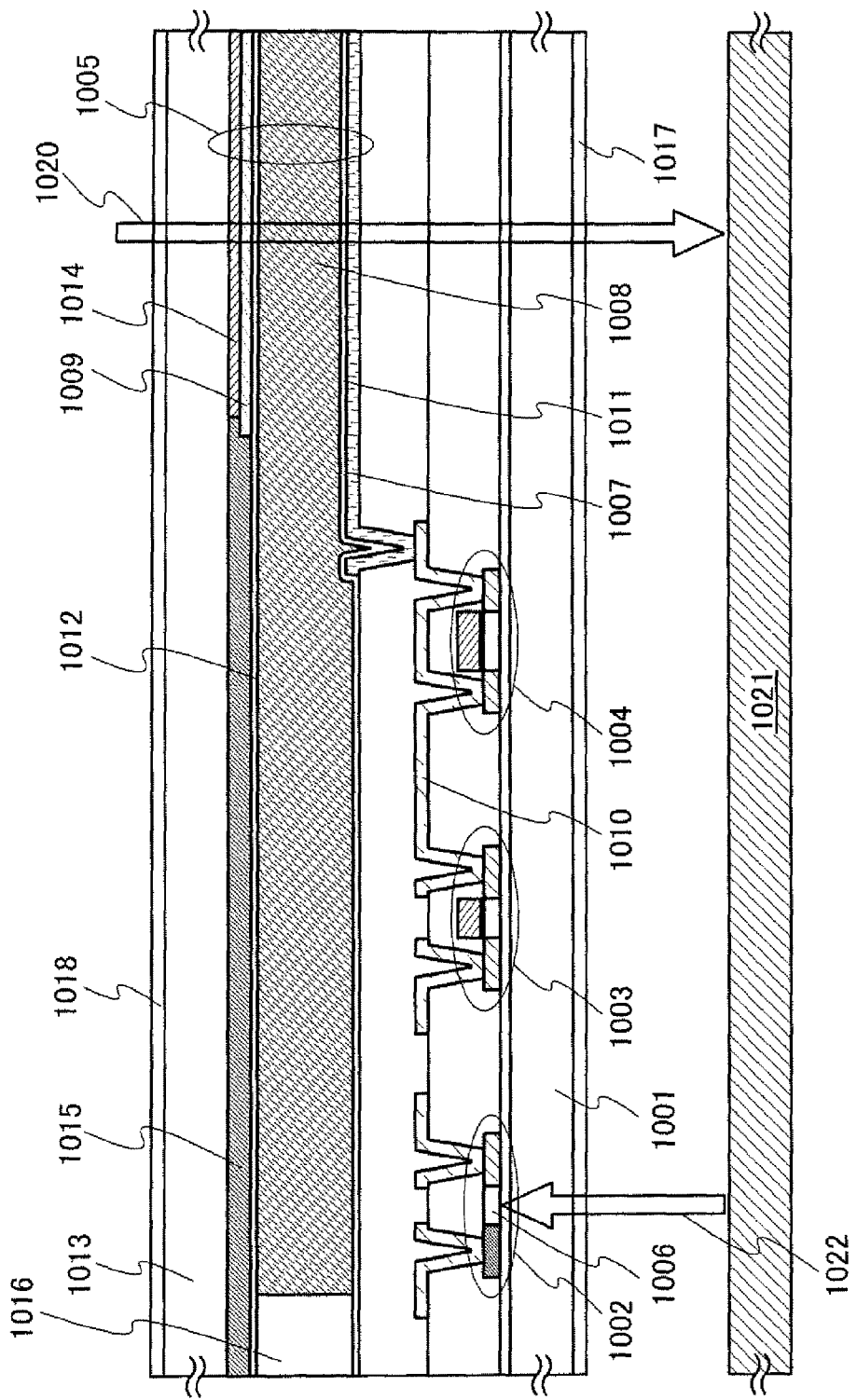
FIG. 11 illustrates a cross-sectional view of a touch panel.

FIG. 11 illustrates an example of a cross-sectional view of the touch panel. In the touch panel illustrated in FIG. 11, a photodiode 1002, a transistor 1003, a storage capacitor 1004, and a liquid crystal element 1005 are formed over a substrate 1001 having an insulating surface.

The photodiode 1002 and the storage capacitor 1004 can be formed at the same time as the transistor 1003 is formed in a manufacturing process of the transistor 1003. The photodiode 1002 is a lateral junction pin diode. A semiconductor film 1006 included in the photo diode 1002 has a region having p-type conductivity (p layer), a region having i-type conductivity (i layer), and a region having n-type conductivity (n layer). Note that although the case where the photodiode 1002 is a pin diode is illustrated in this embodiment, the photodiode 1002 may be a pn diode. With lateral pin junction or lateral pn junction, an impurity imparting p-type conductivity and an impurity imparting n-type conductivity can be added to respective particular regions in the semiconductor film 1006.

In addition, although the case where the photo diode 1002 is a lateral-junction diode in which a p layer and an n layer are formed in different regions is illustrated, the photodiode 1002 may be a vertical junction diode in which a p layer and an n layer overlap with each other in direction perpendicular to the substrate 1001. The vertical pin junction can be obtained by stacking a semiconductor film having p-type conductivity, a semiconductor film having i-type conductivity, and a semiconductor film having n-type conductivity. Similarly, vertical pn junction can be obtained by stacking a semiconductor film having p-type conductivity and a semiconductor film having n-type conductivity.

The liquid crystal element 1005 includes a pixel electrode 1007, liquid crystals 1008, and a counter electrode 1009. The pixel electrode 1007 is formed over the substrate 1001 and is electrically connected to the transistor 1003 through the storage capacitor 1004 and a conductive film 1010. In addition, the counter electrode 1009 is formed on the substrate 1013 and the liquid crystals 1008 are interposed between the pixel electrode 1007 and the counter electrode 1009. Note that although a transistor used for a photo sensor is not illustrated in this embodiment, the transistor can be formed over the substrate 1001 together with the transistor 1003 in the manufacturing process for the transistor 1003.

A cell gap between the pixel electrode 1007 and the counter electrode 1009 can be controlled by using a spacer 1016. In FIG. 11, the cell gap is controlled by using the columnar spacer 1016 selectively formed by photolithography. Alternatively, the cell gap can be controlled by dispersing spherical spacers between the pixel electrode 1007 and the counter electrode 1009.

In addition, the liquid crystals 1008 are surrounded by a sealing material between the substrate 1001 and the substrate 1013. The liquid crystals 1008 may be injected by a dispenser method (droplet method) or a dipping method (pumping method).

For the pixel electrode 1007, a light-transmitting conductive material such as indium tin oxide (ITO), indium tin oxide containing silicon oxide (ITSO), organic indium, organic tin, indium zinc oxide (IZO) containing zinc oxide (ZnO), zinc oxide (ZnO), ZnO containing gallium (Ga), tin oxide ($SnO_2$), indium oxide containing tungsten oxide, indium zinc oxide containing tungsten oxide, indium oxide containing titanium oxide, indium tin oxide containing titanium oxide, or the like can be used.

In addition, since the transparent liquid crystal element 1005 is given as an example, the above-described light-transmitting conductive material can be used also for the counter electrode 1009 like in the case of the pixel electrode 1007.

An alignment film 1011 is provided between the pixel electrode 1007 and the liquid crystals 1008 and an alignment film 1012 is provided between the counter electrode 1009 and the liquid crystals 1008. The alignment film 1011 and the alignment film 1012 can be formed using an organic resin such as polyimide or polyvinyl alcohol. An alignment treatment such as rubbing is performed on their surfaces in order to align liquid crystal molecules in certain direction. Rubbing can be performed by rolling a roller wrapped with cloth of nylon or the like while applying pressure on the alignment film so that the surface of the alignment film is rubbed in certain direction. Note that by using an inorganic material such as silicon oxide, the alignment film 1011 and the alignment film 1012 each having an alignment property can be directly formed by evaporation method without performing an alignment treatment.

Further, a color filter 1014 which can pass light in a certain wavelength range is formed over the substrate 1013 so as to overlap with the liquid crystal element 1005. The color filter 1014 can be selectively formed by photolithography after application of an organic resin such as an acrylic-based resin in which colorant is dispersed on the substrate 1013. Alternatively, color filter 1014 can be selectively formed by etching after application of a polyimide-based resin in which colorant is dispersed on the substrate 1013. Alternatively, the color filter 1014 can be selectively formed by a droplet discharge method such as an ink jet method.

Furthermore, a shielding film 1015 which can block light is formed over the substrate 1013 so as to overlap with the photodiode 1002. By providing of the shielding film 1015, light from a backlight that passes through the substrate 1013 and enters the touch panel can be prevented from being directly delivered to the photodiode 1002. Further, disclination due to disorder of alignment of the liquid crystals 1008 among pixels can be prevented from being viewed. An organic resin containing black colorant such as carbon black or titanium lower oxide in which the number of oxides is smaller than that of titanium dioxide can be used for the shielding film 1015. Alternatively, a film of chromium can be used for the shielding film 1015.

Furthermore, a polarizing plate 1017 is provided on a surface which is the reverse side of a surface of the substrate 1001 over which the pixel electrode 1007 is formed and a polarizing plate 1018 is provided on a surface which is the reverse side of a surface of the substrate 1013 over which the counter electrode 1009 is formed.

Light from the backlight passes through the liquid crystal element 1005 and is delivered to an object 1021 to be detected on the substrate 1001 side as shown by an arrow 1020. Then, light reflected by the object 1021 to be detected enters the photodiode 1002 as shown by an arrow 1022.

The liquid crystal element may be a TN (twisted nematic) mode liquid crystal element, a VA (vertical alignment) mode liquid crystal element, an OCB (optically compensated birefringence) mode liquid crystal element, an IPS (in-plane switching) mode liquid crystal element, or the like. Note that although an example of the liquid crystal element 1005 in which the liquid crystals 1008 are interposed between the pixel electrode 1007 and the counter electrode 1009 is given in this embodiment, the touch panel in one embodiment of the present invention is not limited to this structure. A liquid crystal element in which a pair of electrodes are formed on the substrate 1001 side like an IPS mode liquid crystal element may also be employed.

In addition, although an example in which a thin semiconductor film is used for the photodiode 1002, the transistor 1003, and the storage capacitor 1004 is illustrated in this embodiment, a single crystal semiconductor substrate, an SOI substrate, or the like can be used for the photodiode 1002, the transistor 1003, and the storage capacitor 1004.

EXAMPLE 1

The touch panel in one embodiment of the present invention has a characteristic of image reading of high resolution and high-level gray scale at high speed and with low power consumption. Therefore, an electronic device using the touch panel in one embodiment of the present invention can be provided with applications with higher performance by employing a touch panel as its component. In particular, in the case of a portable electronic device which cannot be constantly supplied with electric power, by employing a touch panel as its component, an advantage that continuous operating time is made longer can be obtained in addition to an advantage that the portable electronic device can be provided with applications with higher performance. The touch panel in the present invention can be included in display devices, laptop computers, and image reproducing devices provided with recording media (typically devices which reproduce the content of recording media such as DVDs (digital versatile disc) and have displays for displaying the reproduced images). Other than above, as an electronic device which can use the touch panel in one embodiment of the present invention, mobile phones, portable game machines, portable information terminals, e-book readers, video cameras, digital still cameras, goggle-type displays (head mounted displays), navigation systems, audio reproducing devices (e.g., car audio components and audio components), copiers, facsimiles, printers, multifunction printers, automated teller machines (ATM), vending machines, and the like can be given. FIGS. 12A to 12E illustrate specific examples of these electronic devices.

Figure 12A:
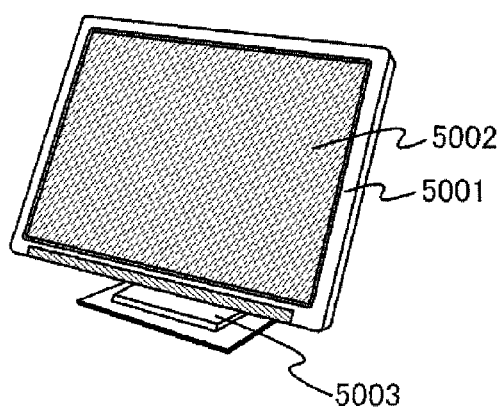
FIGS. 12A to 12E each illustrate an electronic device using a touch panel.

FIG. 12A illustrates a display device including a housing 5001, a display portion 5002, a supporting base 5003, and the like. The touch panel in one embodiment of the present invention can be used for the display portion 5002. By using the touch panel in one embodiment of the present invention for the display portion 5002, image reading of high resolution and high-level gray scale can be performed at high speed and with low power consumption and a display device with applications of higher performance can be provided. Note that a display device includes all display devices for displaying information, such as display devices for personal computers, for receiving television broadcast, and for displaying advertisement, in its category.

Figure 12B:
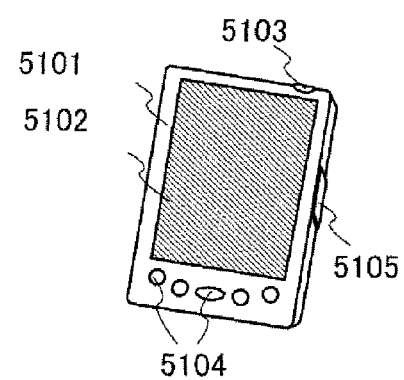

FIG. 12B illustrates a portable information terminal including a housing 5101, a display portion 5102, a switch 5103, an operation key 5104, an infrared rays port 5105, and the like. The touch panel in one embodiment of the present invention can be used for the display portion 5102. By using the touch panel in one embodiment of the present invention for the display portion 5102, image reading of high resolution and high-level gray scale can be performed at high speed and with low power consumption and a portable information terminal with applications of higher performance can be provided.

Figure 12C:
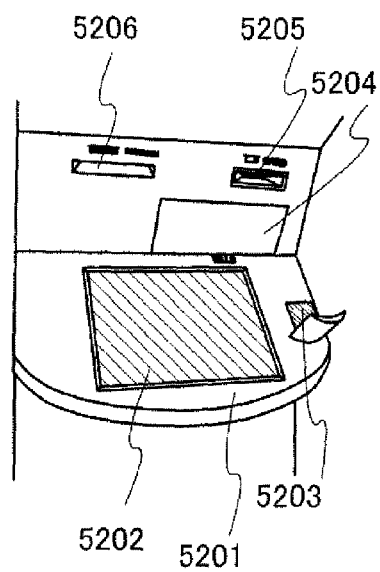

FIG. 12C illustrates an automated teller machine including a housing 5201, a display portion 5202, a coin slot 5203, a bill slot 5204, a card slot 5205, a bankbook slot 5206, and the like. The touch panel in one embodiment of the present invention can be used for the display portion 5202. By using the touch panel in one embodiment of the present invention for the display portion 5202, image reading of high resolution and high-level gray scale can be performed at high speed and with low power consumption and an automated teller machine with applications of higher performance can be provided. The automated teller machine using the touch panel in one embodiment of the present invention can read information of living body such as a finger print, a face, a handprint, a palm print, a pattern of a hand vein, an iris, and the like which are used for biometrics with higher accuracy. Therefore, a false non-match rate which is false recognition of a person to be identified as a different person and a false acceptance rate which is false recognition of a different person as a person to be identified can be suppressed.

Figure 12D:
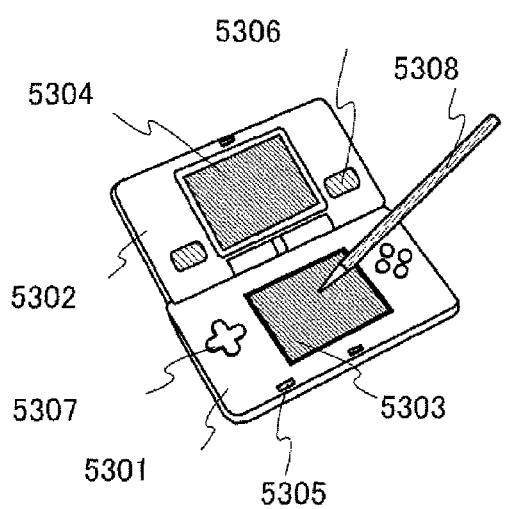

FIG. 12D illustrates a portable game machine including a housing 5301, a housing 5302, a display portion 5303, a display portion 5304, a microphone 5305, speakers 5306, an operation key 5307, a stylus 5308, and the like. The touch panel in one embodiment of the present invention can be used for the display portion 5303 or the display portion 5304. By using the touch panel in one embodiment of the present invention for the display portion 5303 or the display portion 5304, image reading of high resolution and high-level gray scale can be performed at high speed and with low power consumption and a portable game machine with applications of higher performance can be provided. Note that although the portable game machine illustrated in FIG. 12D includes two display portions 5303 and 5304, the number of display portions included in the portable game machine is not limited to two.

Figure 12E:
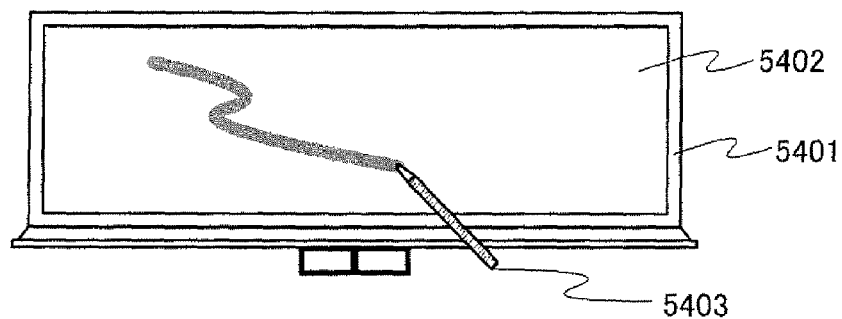

FIG. 12E illustrates an electronic black board which includes a housing 5401, a drawing portion 5402, and the like. Information such as texts or drawings can be written on the drawing portion 5402 of the electronic black board with the stylus 5403, a marker using oil-based ink, or the like. Further, the electronic black board can make information written on the drawing portion 5402 electronic data by using a photo sensor. In the case of using the stylus 5403, the information written on the drawing portion 5402 is made electronic data by the photo sensor and then displayed on the drawing portion 5402 by a display element. The touch panel in one embodiment of the present invention can be used for the drawing portion 5402. By using the touch panel in one embodiment of the present invention for the drawing portion 5402, image reading of high resolution and high-level gray scale can be performed at high speed and with low power consumption and an electronic black board with applications of higher performance can be provided.

This embodiment can be implemented by being combined as appropriate with any of the aforementioned embodiments and example.

This application is based on Japanese Patent Application serial no. 2009-150602 filed with Japan Patent Office on Jun. 25, 2009, the entire contents of which are hereby incorporated by reference.

What is claimed is:

1. A touch panel comprising:
a plurality of pixels each comprising a display element and a photo sensor; and
an A/D converter configured to be supplied with a first potential from the photo sensor, the A/D converter comprising an oscillation circuit and a counter circuit,
wherein the oscillation circuit comprises a latch circuit,
wherein the oscillation circuit is configured to generate a first signal having an oscillation frequency determined in accordance with the first potential, and to store a potential of the first signal in the oscillation circuit by applying a second potential to the latch circuit, the stored potential of the first signal being used as a potential of a least significant bit of the A/D converter,
wherein the counter circuit is configured to generate a second signal having a discrete value determined in accordance with the oscillation frequency,
wherein the oscillation circuit starts oscillating when a third potential is applied thereto, and
wherein a period from when the oscillation circuit starts oscillating to when the first signal has a toggle is approximately half an oscillation cycle of the oscillation circuit.

2. The touch panel according to claim 1,
wherein the display element comprises a transistor, a storage capacitor, and a liquid crystal element,
wherein the photo sensor comprises a photo diode, and
wherein the transistor, the storage capacitor, the liquid crystal element, and the photo diode are formed over the same substrate.

3. A liquid crystal display device including the touch panel according to claim 1.

4. A driving method of a touch panel comprising the steps of:
applying a first potential from a photo sensor included in each of a plurality of pixels to an A/D converter,
generating a first signal by an oscillation circuit included in the A/D converter, the first signal having an oscillation frequency determined in accordance with the first potential,
storing a potential of the first signal in the oscillation circuit by applying a second potential to a latch circuit, the stored potential of the first signal being used as a potential of a least significant bit of the A/D converter, and
generating a second signal by a counter circuit included in the A/D converter, the second signal having a discrete value determined in accordance with the oscillation frequency after storing the potential of the first signal by applying the second potential to the latch circuit,
wherein the oscillation circuit starts oscillating when a third potential is applied thereto, and
wherein a period from when the oscillation circuit starts oscillating to when the first signal has a toggle is approximately half an oscillation cycle of the oscillation circuit.

5. The driving method of a touch panel according to claim 4,
wherein the plurality of pixels each comprising a display element and the photo sensor,
wherein the display element comprises a transistor, a storage capacitor, and a liquid crystal element,
wherein the photo sensor comprises a photo diode, and
wherein the transistor, the storage capacitor, the liquid crystal element, and the photo diode are formed over the same substrate.

6. The driving method of a touch panel according to claim 4, wherein the touch panel is included in a liquid crystal display device.

7. A semiconductor device comprising:
a plurality of pixels each comprising a photo sensor; and
an A/D converter configured to be supplied with a first potential from the photo sensor, the A/D converter comprising an oscillation circuit and a counter circuit, wherein the oscillation circuit comprises a latch circuit,
wherein the oscillation circuit is configured to generate a first signal having an oscillation frequency determined in accordance with the first potential, and to store a potential of the first signal in the oscillation circuit by applying a second potential to the latch circuit, the stored potential of the first signal being used as a potential of a least significant bit of the A/D converter,
wherein the counter circuit is configured to generate a second signal having a discrete value determined in accordance with the oscillation frequency,
wherein the oscillation circuit starts oscillating when a third potential is applied thereto, and
wherein a period from when the oscillation circuit starts oscillating to when the first signal has a toggle is approximately half an oscillation cycle of the oscillation circuit.

8. The semiconductor device according to claim 7, wherein the photo sensor comprises a photo diode.

9. A liquid crystal display device including the semiconductor device according to claim 7.

10. A driving method of a semiconductor device comprising the steps of:
applying a first potential from a photo sensor included in each of a plurality of pixels to an A/D converter,
generating a first signal by an oscillation circuit included in the A/D converter, the first signal having an oscillation frequency determined in accordance with the first potential,
storing a potential of the first signal in the oscillation circuit by applying a second potential to a latch circuit, the stored potential of the first signal being used as a potential of a least significant bit of the A/D converter, and
generating a second signal by a counter circuit included in the A/D converter, the second signal having a discrete value determined in accordance with the oscillation frequency after storing the potential of the first signal by applying the second potential to the latch circuit,
wherein the oscillation circuit starts oscillating when a third potential is applied thereto, and
wherein a period from when the oscillation circuit starts oscillating to when the first signal has a toggle is approximately half an oscillation cycle of the oscillation circuit.

11. The driving method of a semiconductor device according to claim 10,
wherein the plurality of pixels each comprising a display element and the photo sensor,
wherein the display element comprises a transistor, a storage capacitor, and a liquid crystal element,
wherein the photo sensor comprises a photo diode, and
wherein the transistor, the storage capacitor, the liquid crystal element, and the photo diode are formed over the same substrate.

12. The driving method of a semiconductor device according to claim 10, wherein the semiconductor device is included in a liquid crystal display device.

* * * * *